US010367897B2

(12) United States Patent
Tian et al.

(10) Patent No.: US 10,367,897 B2
(45) Date of Patent: Jul. 30, 2019

(54) METHOD AND APPARATUS FOR RELEASING SERVICES IN STAGES

(71) Applicant: Tencent Technology (Shenzhen) Company Limited, Shenzhen, Guangdong (CN)

(72) Inventors: Ming Tian, Shenzhen (CN); Lihua Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 238 days.

(21) Appl. No.: 14/734,653

(22) Filed: Jun. 9, 2015

(65) Prior Publication Data

US 2015/0281379 A1 Oct. 1, 2015

Related U.S. Application Data

(63) Continuation of application No. PCT/CN2013/089728, filed on Dec. 17, 2013.

(30) Foreign Application Priority Data

Jan. 9, 2013 (CN) .......................... 2013 1 0007772

(51) Int. Cl.
*H04L 29/08* (2006.01)
*H04L 29/06* (2006.01)

(52) U.S. Cl.
CPC .............. *H04L 67/16* (2013.01); *H04L 67/22* (2013.01); *H04L 69/24* (2013.01); *H04L 69/28* (2013.01)

(58) Field of Classification Search
USPC ......................................... 709/217, 223–226
See application file for complete search history.

(56) References Cited

U.S. PATENT DOCUMENTS

| 7,555,551 B1* | 6/2009 | McCorkendale ......... G06F 8/65 |
| | | 709/225 |
| 7,764,615 B2* | 7/2010 | Gilfix .................... H04L 67/322 |
| | | 370/230.1 |

(Continued)

FOREIGN PATENT DOCUMENTS

| CN | 102064954 A | 5/2011 |
| CN | 102413022 A | 4/2012 |
| CN | 102497454 A | 6/2012 |

OTHER PUBLICATIONS

Paetsch, Frauke, Armin Eberlein, and Frank Maurer. "Requirements engineering and agile software development." In Enabling Technologies: Infrastructure for Collaborative Enterprises, 2003. WET ICE 2003. Proceedings. Twelfth IEEE International Workshops on, pp. 308-313. IEEE, 2003.*

(Continued)

*Primary Examiner* — Cheikh T Ndiaye
*Assistant Examiner* — Melaku Y Habtemariam
(74) *Attorney, Agent, or Firm* — Anova Law Group, PLLC (57) ABSTRACT

A method and apparatus for releasing services on a server in stages is provided, the method comprising setting a number of accounts that can access a new service and releasing the new service to the accounts in a first time period; setting an access rate for the new service and releasing the new service in accordance with the access rate in a second time period; and releasing the new service to the entire server in a third time period. In accordance with the method and apparatus for releasing services on a server in stages in this embodiment, new service can be released in different ways to suit different situations, which reduces the risk in releasing the new service, and improves efficiency.

16 Claims, 4 Drawing Sheets

(56) References Cited

U.S. PATENT DOCUMENTS

| | | | | |
|---|---|---|---|---|
| 2004/0019889 A1* | 1/2004 | Melchione | ................ | G06F 8/61 |
| | | | | 717/177 |
| 2006/0248116 A1* | 11/2006 | Sobel | ........................ | G06F 8/65 |
| 2009/0210921 A1* | 8/2009 | Ramsdell | ................ | H04L 41/12 |
| | | | | 725/120 |
| 2014/0089915 A1* | 3/2014 | Haserodt | ................... | G06F 8/65 |
| | | | | 717/178 |

OTHER PUBLICATIONS

The World Intellectual Property Organization (WIPO) International Search Report for PCT/CN2013/089728 dated Mar. 13, 2014 3 Pages.

The State Intellectual Property Office of the People's Republic of China (SIPO) Office Action 1 for 201310007772.3 dated Aug. 28, 2017 8 Pages (including translation).

Cheng, Qian, Research on the Technology of Massive Service in Music Box Background Music Project, China Master's Theses Full-Text Database (CMFD), Information Science and Technology, Jul. 15, 2012. No. 7, pp. I138-I280, ISSN 1674-0246, 68 pages.

\* cited by examiner

METHOD AND APPARATUS FOR RELEASING SERVICES IN STAGES

CROSS-REFERENCE TO RELATED APPLICATIONS

This application is a continuation of International Patent Application No. PCT/CN2013/089728, entitled "Method and Apparatus for Releasing Services in Stages," filed on Dec. 26, 2013. This application claims the benefit and priority of Chinese Patent Application No. 201310007772.3, entitled "Method and Apparatus for Releasing Services in Stages" filed on Jan. 9, 2013. The entire disclosures of each of the above applications are incorporated herein by reference.

TECHNICAL FIELD

The present invention relates to internet technologies, and more particularly to a method and apparatus for releasing services on a server in stages.

BACKGROUND

There are a wide variety of services available on the internet, such as the services on the QQ platform provided by Tencent Technology. Whenever a new version of service is released, a large number of users will be affected. Thus, the network service providers typically release new service in stages (also called gradual conversion), wherein the new service is first released to a small number of users, while the remaining users continue to use the old service; if it is proven that there is no issue for the new service as used by the small number of users, the remaining users will be gradually migrated to the new service.

There are two methods of releasing new service in stages.

In the first method, the new service is released in stages one server a time.

In the second method, all the users are divided into a number of units, and the new service is released in stages one user unit a time.

In the first method, as each server may handle large number of user accesses, there is still substantial risk in releasing the new service.

In the second method, if the number of user units is small, the risk is not well controlled; if the number of user units is large, it is not very efficient as it may take a substantial amount of time to release the new service to all users.

Thus, there is a need to provide a method and apparatus for releasing services on a server in stages of low risk and high efficiency to address the issues in the prior art.

SUMMARY OF THE INVENTION

The present invention provides a method and apparatus for releasing services on a server in stages, wherein new service can be released in different ways to suit different situations to reduce the risk and improve efficiency.

In accordance with embodiments of the present invention, a method for releasing services on a server in stages is provided, the method comprising: setting a number of accounts that can access a new service and releasing the new service to the accounts in a first time period; setting an access rate for the new service and releasing the new service in accordance with the access rate in a second time period; and releasing the new service to the entire server in a third time period.

In accordance with embodiments of the present invention, an apparatus for releasing services on a server in stages is provided, the apparatus comprising: a first releasing module for setting a number of accounts that can access a new service and releasing the new service to the accounts in a first time period; a second releasing module for setting an access rate for the new service and releasing the new service in accordance with the access rate in a second time period; and a third releasing module for releasing the new service to the entire server in a third time period.

In accordance with embodiments of the present invention, a method for releasing services on a server in stages is provided, the method comprising: setting an access rate for a new service and releasing the new service in accordance with the access rate; receiving a feedback from a user using the new service; and increasing the access rate for the new service if the feedback is positive.

In accordance with embodiments of the present invention, an apparatus for releasing services on a server in stages is provided, the apparatus comprising: an access rate setting module for setting an access rate for a new service and releasing the new service in accordance with the access rate; a receiving module for receiving a feedback from a user using the new service; and a first releasing module for increasing the access rate for the new service if the feedback is positive.

In accordance with the method and apparatus for releasing services on a server in stages in this embodiment, new service can be released in different ways to suit different situations, which reduces the risk in releasing the new service, and improves efficiency.

BRIEF DESCRIPTION OF THE DRAWINGS

To better illustrate the technical features of the embodiments of the present invention, various embodiments of the present invention will be briefly described in conjunction with the accompanying drawings.

DESCRIPTION OF THE PREFERRED EMBODIMENTS

To better illustrate the purpose, technical feature, and advantages of the embodiments of the present invention, various embodiments of the present invention will be further described in conjunction with the accompanying drawings.

Figure 1:
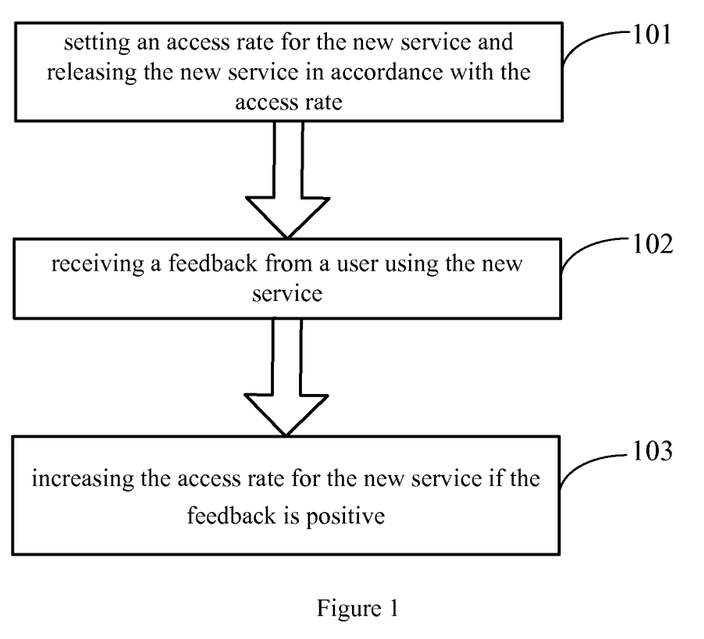
FIG. 1 is an exemplary flowchart for a method for releasing services on a server in stages in accordance with an embodiment of the present invention.

FIG. 1 is an exemplary flowchart for a method for releasing services on a server in stages in accordance with an embodiment of the present invention.

As shown in FIG. 1, the method includes the following steps.

Step 101: setting an access rate for a new service and releasing the new service in accordance with the access rate.

Step 102: receiving a feedback from a user using the new service.

Step 103: increasing the access rate for the new service if the feedback is positive.

The method for releasing services on a server in stages in this embodiment concludes at Step 103.

The implementation of each step in the method will be described in more details below.

In Step 101, the server releases the new service while controlling the access rate to the new service. First, an access rate for the new service is set, which limits the number of accesses to the new service in a time period, and the new service is released in accordance with the access rate.

Step 102 is next.

In Step 102, feedbacks for the new service are received from the users. The feedbacks can be received directly from the client terminals, or from the client terminals via the server.

Step 103 is next.

In Step 103, if the received feedbacks for the new service are positive, then the access rate for the new service is increased to release the new service in stages. For example, the initial access rate for a server might be set as 1 access per minute, and the access rate can be gradually increased if there is no issue with the new service.

Thus, the new service can be tested in different situations, which helps to expose any risk in the new service. Furthermore, the scope of the risk in releasing the new service can be easily controlled.

The method of releasing new service by controlling the access rate for the new service can be implemented with the following pseudo code:

```
if (gsziWLimit[giSvrId] > 0)
# determining whether an access rate is set; if 0, access rate is not limited#
    { if (gsziWlimitCount[giSvrId] >= gsziWLimit[giSvrId])
    { dwTimeTmp = time(NULL);
    if (dwTimeTmp > gsziWlimitLastTime[giSvrId]+60)        #the number of accesses per minutes is set#
    {gsziWlimitLastTime[giSvrId] = dwTimeTmp;
    gsziWlimitCount[giSvrId] = 1;
        pstSvr = &(pstSvrCfgList->astSvrCfgList[giSvrId]);
    }
        else
        { return 0; #if the number of accesses requests exceeds the set number, redirect the extra access requests to an old service#
    }
    }
    else
    { gsziWlimitCount[giSvrId]++;
        pstSvr = &(pstSvrCfgList->astSvrCfgList[giSvrId]);
    # if the number of accesses requests does not exceed the set number, direct the access requests to the new service #
    }
}
```

Preferably, an initial access rate and a maximum access rate for the new service are set in Step 101. In Step 103, the access rate for the new service is increased from the initial access rate gradually to the maximum access rate to release the new service in stages.

Also, in releasing the new service, if the feedbacks indicate that there is error with the new service, the release of the new service can be stopped. Regardless in which stage the new service has been released, the release of the new service will be stopped whenever an error occurred on the server, which reduces the risk in releasing the new service.

Thus, all the steps in the method for releasing services on a server in stages in this embodiment are completed.

In accordance with the method for releasing services on a server in stages in this embodiment, the access rate for a new service is controlled in releasing the new service, and the number of accesses to the new service during a particular time period can be set to suit different situations, which reduces the risk in releasing the new service, and improves efficiency.

Figure 2:
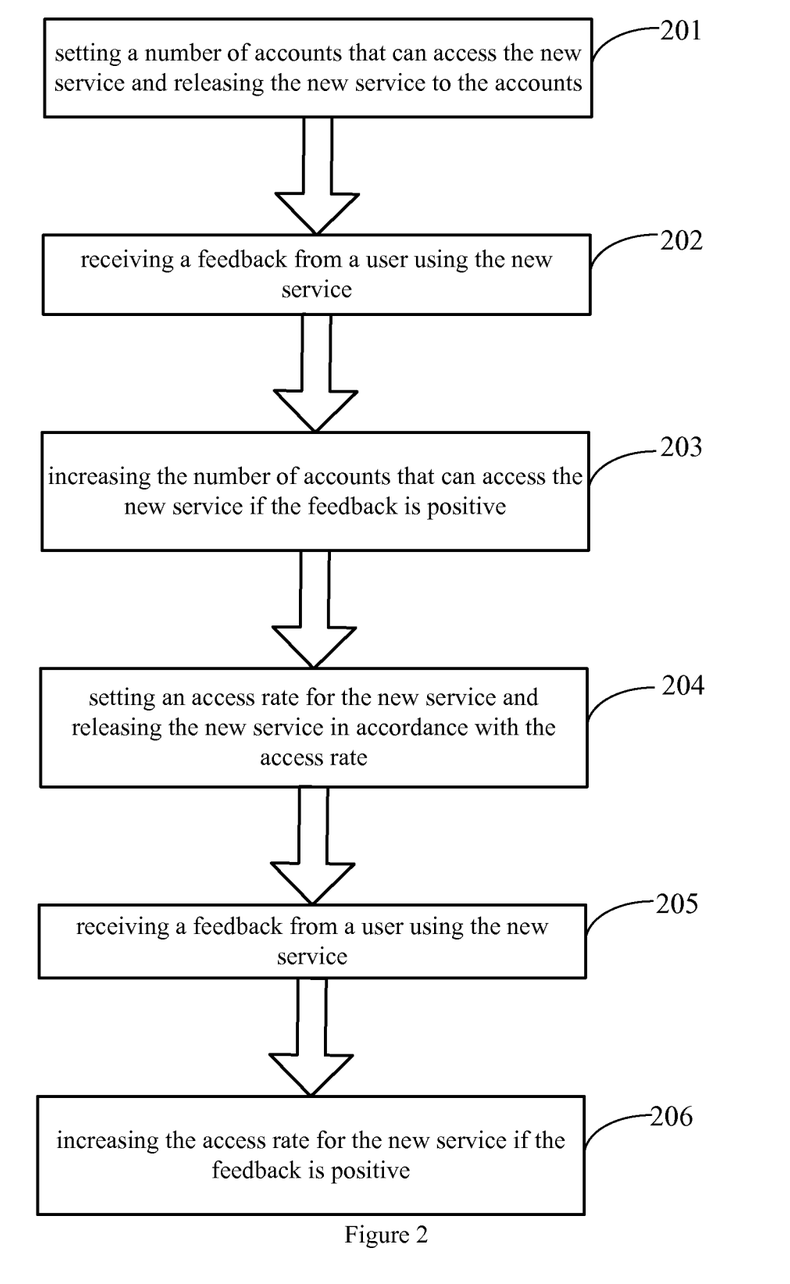
FIG. 2 is an exemplary flowchart for a method for releasing services on a server in stages in accordance with another embodiment of the present invention.

FIG. 2 is an exemplary flowchart for a method for releasing services on a server in stages in accordance with another embodiment of the present invention. As shown in FIG. 2, the method includes the following steps.

Step 201: setting a number of accounts that can access the new service and releasing the new service to the accounts.

Step 202: receiving a feedback from a user using the new service.

Step 203: increasing the number of accounts that can access the new service if the feedback is positive.

Step 204: setting an access rate for the new service and releasing the new service in accordance with the access rate.

Step 205: receiving a feedback from a user using the new service.

Step 206: increasing the access rate for the new service if the feedback is positive.

The method for releasing services on a server in stages in this embodiment concludes at Step 206.

The implementation of each step in the method will be described in more details below.

In Step 201, the server releases the new service while controlling the accounts that can access the new service. First, the accounts that can access the new service are set, and the new service is released only to these accounts.

Step 202 is next.

In Step 202, feedbacks for the new service are received from the users. The feedbacks can be received directly from the client terminals, or from the client terminals via the server.

Step 203 is next.

In Step 203, if the received feedbacks for the new service are positive, then the accounts that can access the new service are increased to release the new service in stages. For example, a certain number of users can be directed to a new server to receive the new service, while the remaining users will be directed to an old server that does not contain the new service, and the number of accounts directed to the new server can be gradually increased if there is no issue with the new service.

Thus, the new service can be tested in the initial stage using a limited number of accounts, which limits the risk of the new service to a limited number of accounts, and facilitates the identification of any issues with the new service.

The method of releasing new service by controlling the accounts accessing the new service can be implemented with the following pseudo code:

```
if((dwTestUin>0)&&(dwUsr==dwTestUin)
   &&(dwTestSvr>0)&&(dwTestSvr<MAX_SERVER_NUM))
{
pstSvr = &(pstSvrCfgList->astSvrCfgList[dwTestSvr]);
}
``` wherein wTestUin is a preset user account. When a user requests access to a server, and the user account dwUsr is dwTestUin, that user will be directed to a new server for the new service.

Preferably, an initial number and a maximum number of accounts that can access the new service are set in Step 201. In Step 203, the number of accounts that can access the new service is increased from the initial number gradually to the maximum number to release the new service in stages.

Step 204 is next.

In step 204, the access rate for the new service is set so that the number of accounts accessing the new service is largely the same as the maximum number of accounts in Step 203, which ensures a smooth transition from Step 203 to Step 204.

Step 204 in this embodiment is the same or similar to Step 101 in the embodiment above, the description of Step 101 in the embodiment above can be referenced for the implementation of Step 204.

Step 205 in this embodiment is the same or similar to Step 102 in the embodiment above, the description of Step 102 in the embodiment above can be referenced for the implementation of Step 205.

Step 206 in this embodiment is the same or similar to Step 103 in the embodiment above, the description of Step 103 in the embodiment above can be referenced for the implementation of Step 206.

Also, in releasing the new service, if the feedbacks indicate that there is error with the new service, the release of the new service can be stopped. Regardless in which stage the new service has been released, the release of the new service will be stopped whenever an error occurred on the server, which reduces the risk in releasing the new service.

Thus, all the steps in the method for releasing services on a server in stages in this embodiment are completed.

In accordance with the method for releasing services on a server in stages in this embodiment, the accounts having access to a new service and the access rate for the new service are both controlled in releasing the new service, and new service can be released accordingly to suit different situations, which reduces the risk in releasing the new service, and improves efficiency.

Figure 3:
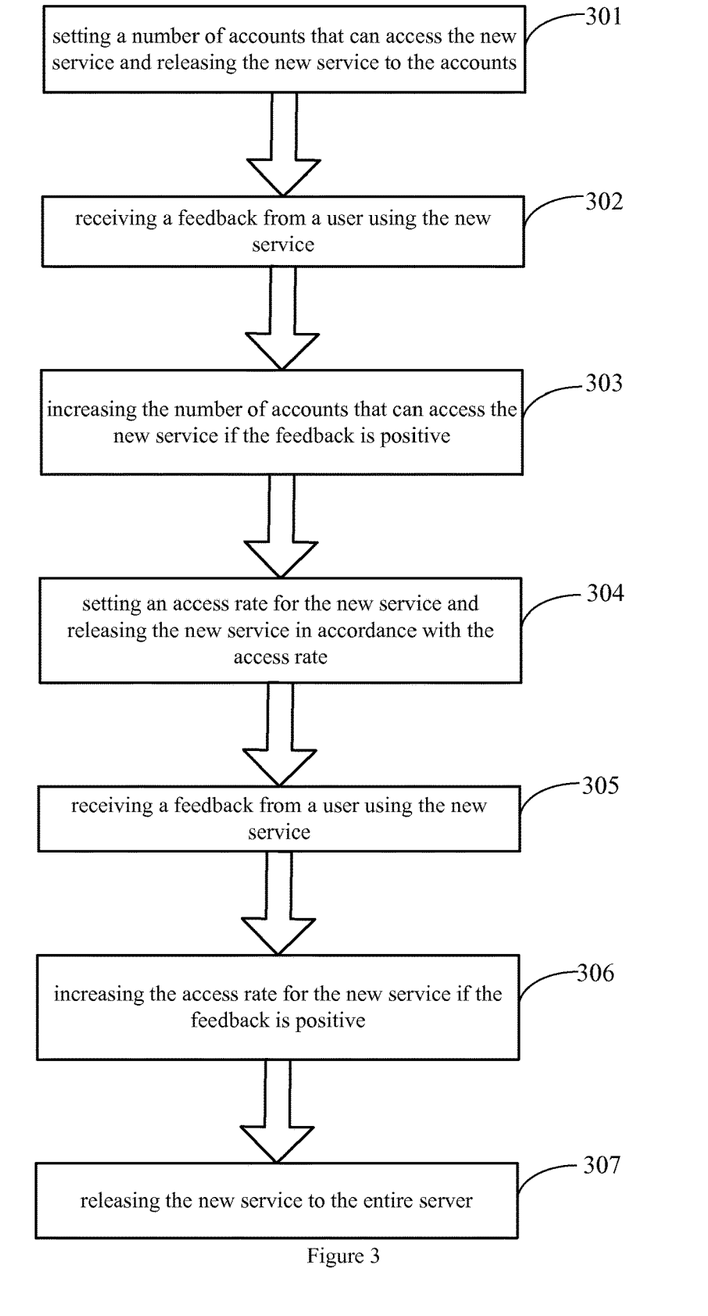
FIG. 3 is an exemplary flowchart for a method for releasing services on a server in stages in accordance with yet another embodiment of the present invention.

FIG. 3 is an exemplary flowchart for a method for releasing services on a server in stages in accordance with yet another embodiment of the present invention. As shown in FIG. 3, the method includes the following steps.

Step 301: setting a number of accounts that can access the new service and releasing the new service to the accounts.

Step 302: receiving a feedback from a user using the new service.

Step 303: increasing the number of accounts that can access the new service if the feedback is positive.

Step 304: setting an access rate for the new service and releasing the new service in accordance with the access rate.

Step 305: receiving a feedback from a user using the new service.

Step 306: increasing the access rate for the new service if the feedback is positive.

Step 307: releasing the new service to the entire server.

The method for releasing services on a server in stages in this embodiment concludes at Step 307.

Step 301 in this embodiment is the same or similar to Step 201 in the embodiment above, the description of Step 201 in the embodiment above can be referenced for the implementation of Step 301.

Step 301 in this embodiment is the same or similar to Step 201 in the embodiment above, the description of Step 201 in the embodiment above can be referenced for the implementation of Step 301.

Step 302 in this embodiment is the same or similar to Step 202 in the embodiment above, the description of Step 202 in the embodiment above can be referenced for the implementation of Step 302.

Step 303 in this embodiment is the same or similar to Step 203 in the embodiment above, the description of Step 203 in the embodiment above can be referenced for the implementation of Step 303.

Step 304 in this embodiment is the same or similar to Step 204 in the embodiment above, the description of Step 204 in the embodiment above can be referenced for the implementation of Step 304.

Step 305 in this embodiment is the same or similar to Step 205 in the embodiment above, the description of Step 205 in the embodiment above can be referenced for the implementation of Step 305.

Step 306 in this embodiment is the same or similar to Step 206 in the embodiment above, the description of Step 206 in the embodiment above can be referenced for the implementation of Step 306.

In step 307, if the new service is operating normally under the maximum access rate, it can be determined the new service is stable on the server, and new service can be released to the entire server.

Also, in releasing the new service, if the feedbacks indicate that there is error with the new service, the release of the new service can be stopped. Regardless in which stage the new service has been released, the release of the new service will be stopped whenever an error occurred on the server, which reduces the risk in releasing the new service.

Thus, all the steps in the method for releasing services on a server in stages in this embodiment are completed.

In accordance with the method for releasing services on a server in stages in this embodiment, new service can be released in different ways to suit different situations, which reduces the risk in releasing the new service, and improves efficiency.

Figure 4:
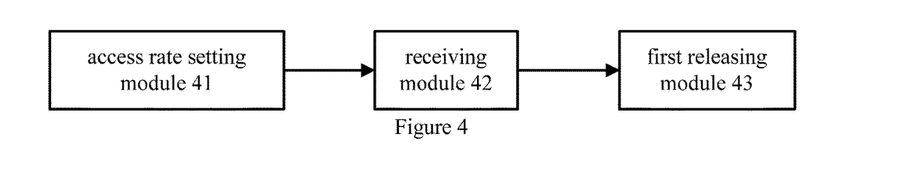
FIG. 4 is an exemplary schematic diagram for an apparatus for releasing services on a server in stages in accordance with an embodiment of the present invention.

FIG. 4 is an exemplary schematic diagram for an apparatus for releasing services on a server in stages in accordance with an embodiment of the present invention. As shown in FIG. 4, the apparatus includes an access rate setting module 41, a receiving module 42, and a first releasing module 43. The access rate setting module 41 is used for setting an access rate for a new service and releasing the new service in accordance with the access rate. The receiving module 42 is used for receiving a feedback from a user using the new service. The first releasing module 43 is used for increasing the access rate for the new service if the feedback is positive.

During the operation of the apparatus for releasing services on a server in stages, the access rate setting module 41 sets an access rate for the new service, which limits the number of accesses to the new service in a time period, and releases the new service in accordance with the access rate. The receiving module 42 receives feedbacks for the new service from the users. If the received feedbacks for the new service are positive, then the first releasing module 43 increases the access rate for the new service to release the new service in stages.

Preferably, the access rate setting module 41 sets an initial access rate and a maximum access rate for the new service, and first releasing module 43 increase the access rate for the new service from the initial access rate gradually to the maximum access rate to release the new service in stages.

Also, apparatus for releasing services on a server in stages in this embodiment can further include an error processing module (not shown in FIG. 4) for stopping the release of the new service if the feedbacks indicate that there is error with the new service.

The operation of the apparatus for releasing services on a server in stages in this embodiment is the same or similar to the method embodiment in FIG. 1, and the description of the method embodiment in FIG. 1 can be referenced for the operation of the apparatus in this embodiment.

In accordance with the apparatus for releasing services on a server in stages in this embodiment, the access rate for a new service is controlled in releasing the new service, and the number of accesses to the new service during a particular time period can be set to suit different situations, which reduces the risk in releasing the new service, and improves efficiency.

Figure 5:
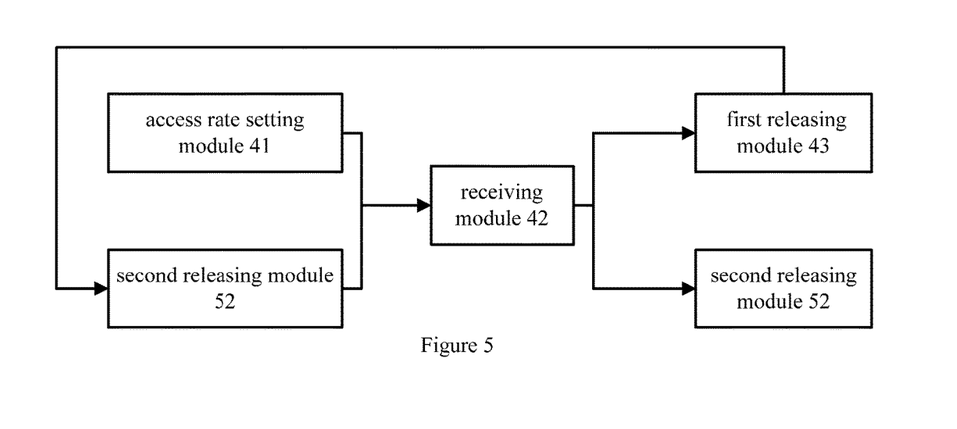
FIG. 5 is an exemplary schematic diagram for an apparatus for releasing services on a server in stages in accordance with another embodiment of the present invention.

FIG. 5 is an exemplary schematic diagram for an apparatus for releasing services on a server in stages in accordance with another embodiment of the present invention. As shown in FIG. 5, in addition to the modules in FIG. 4, the apparatus further includes an access account setting module 51, and a second releasing module 52. The access account setting module 51 is used for setting a number of accounts that can access the new service and releasing the new service to the accounts. The second releasing module 52 is used for increasing the number of accounts that can access the new service if the feedback is positive.

During the operation of the apparatus for releasing services on a server in stages, the access account setting module 51 set the account that can access the new service, and the new service is released only to these accounts. The receiving module 42 receives feedbacks for the new service from the users. If the received feedbacks for the new service are positive, then second releasing module 52 increases the accounts that can access the new service to release the new service in stages. Afterwards, the access rate setting module 41 sets an access rate for the new service, which limits the number of accesses to the new service in a time period, and releases the new service in accordance with the access rate. The receiving module 42 receives feedbacks for the new service from the users. If the received feedbacks for the new service are positive, then the first releasing module 43 increases the access rate for the new service to release the new service in stages.

Preferably, the access account setting module 51 sets an initial number and a maximum number of accounts that can access the new service, and first releasing module 43 increase the number of accounts that can access the new service from the initial number gradually to the maximum number to release the new service in stages.

The operation of the apparatus for releasing services on a server in stages in this embodiment is the same or similar to the method embodiment in FIG. 2, and the description of the method embodiment in FIG. 2 can be referenced for the operation of the apparatus in this embodiment.

In accordance with the apparatus for releasing services on a server in stages in this embodiment, the accounts that can access the new service and the access rate for the new service are both controlled in releasing the new service, and new service can be released accordingly to suit different situations, which reduces the risk in releasing the new service, and improves efficiency.

Figure 6:
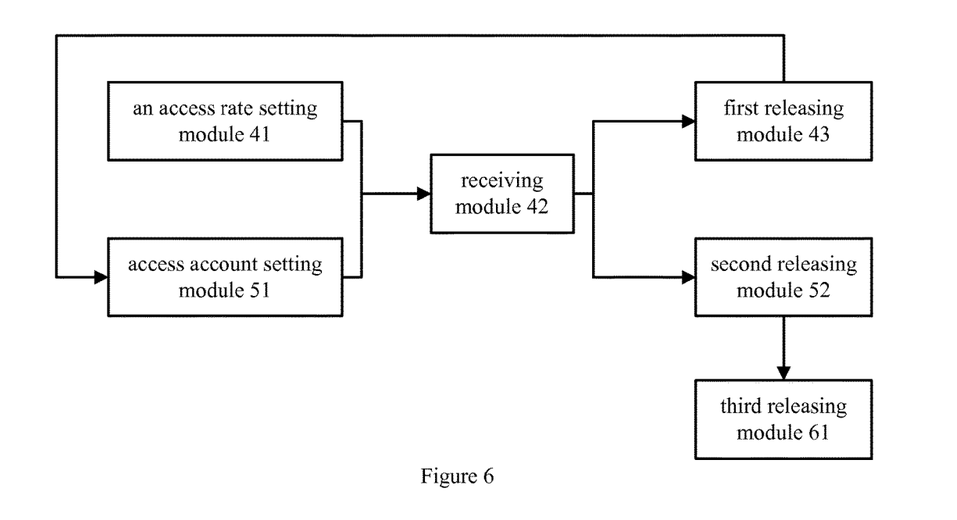
FIG. 6 is an exemplary schematic diagram for an apparatus for releasing services on a server in stages in accordance with yet another embodiment of the present invention.

FIG. 6 is an exemplary schematic diagram for an apparatus for releasing services on a server in stages in accordance with yet another embodiment of the present invention.

As shown in FIG. 6, in addition to the modules in FIG. 5, the apparatus further includes a third releasing module 61. The third release module 61 is used for releasing the new service to the entire server.

During the operation of the apparatus for releasing services on a server in stages, after the second releasing module 52 releases the new service normally under the maximum access rate, the third releasing module 61 releases the new service to the entire server.

The operation of the apparatus for releasing services on a server in stages in this embodiment is the same or similar to the method embodiment in FIG. 3, and the description of the method embodiment in FIG. 3 can be referenced for the operation of the apparatus in this embodiment.

In accordance with the apparatus for releasing services on a server in stages in this embodiment, new service can be released in different ways to suit different situations, which reduces the risk in releasing the new service, and improves efficiency.

The various embodiments of the present invention are merely preferred embodiments, and are not intended to limit the scope of the present invention, which includes any modification, equivalent, or improvement that does not depart from the spirit and principles of the present invention.

The invention claimed is:

1. A method for releasing services on a server in stages, the method comprising:
    setting a number of accounts that can access a new service and releasing the new service to the accounts in a first time period;
    setting an access rate for the new service and releasing the new service in accordance with the access rate in a second time period, wherein the access rate indicates a number of accesses to the new service per unit time; and
    releasing the new service to the entire server in a third time period,
    wherein releasing the new service in accordance with the access rate comprises:
    determining a value of the access rate;
    when an actual number of access requests received by the server during a unit time is greater than the value of the access rate, directing a portion of the actual number of access requests that are over the value of the access rate to an old service corresponding to the new service,
    wherein setting the access rate for the new service and releasing the new service in accordance with the access rate further comprises:

setting an initial access rate and a maximum access rate for the new service; and
increasing the access rate for the new service from the initial access rate to the maximum access rate during the second time period.

2. The method of claim 1, wherein setting a number of accounts that can access the new service and releasing the new service to the accounts comprises:
setting an initial number and a maximum number of accounts that can access the new service; and
increasing the number of accounts that can access the new service from the initial number to the maximum number during the first time period.

3. The method of claim 1, further comprising:
redirecting an access request for the new service to an old service.

4. A non-transitory computer-readable medium having stored thereon computer-executable instructions that, when executed by a hardware processor of a server, cause the hardware processer to perform a method for releasing services on a server in stages, the method comprising:
setting a number of accounts that can access a new service and releasing the new service to the accounts in a first time period;
setting an access rate for the new service and releasing the new service in accordance with the access rate in a second time period, wherein the access rate indicates a number of accesses to the new service per unit time; and
releasing the new service to the entire server in a third time period,
wherein releasing the new service in accordance with the access rate comprises:
determining a value of the access rate;
when an actual number of access requests received by the server during a unit time is greater than the value of the access rate, directing a portion of the actual number of access requests that are over the value of the access rate to an old service corresponding to the new service,
wherein setting the access rate for the new service and releasing the new service in accordance with the access rate comprises:
setting an initial access rate and a maximum access rate for the new service; and
increasing the access rate for the new service from the initial access rate to the maximum access rate during the second time period.

5. The non-transitory computer-readable medium of claim 4, wherein setting a number of accounts that can access the new service and releasing the new service to the accounts comprises:
setting an initial number and a maximum number of accounts that can access the new service; and
increasing the number of accounts that can access the new service from the initial number to the maximum number during the first time period.

6. The non-transitory computer-readable medium of claim 4, the method further comprising redirecting an access request for the new service to an old service.

7. A method for releasing services on a server in stages, the method comprising:
setting an access rate for a new service and releasing the new service in accordance with the access rate, wherein the access rate indicates a number of accesses to the new service per unit time;
receiving a feedback from a user using the new service; and
increasing the access rate for the new service if the feedback is positive,
wherein releasing the new service in accordance with the access rate comprises:
determining a value of the access rate;
when an actual number of access requests received by the server during a unit time is greater than the value of the access rate, directing a portion of the actual number of access requests that are over the value of the access rate to an old service corresponding to the new service,
wherein increasing the access rate for the new service comprises:
setting an initial access rate and a maximum access rate for the new service; and
increasing the access rate for the new service from the initial access rate gradually to the maximum access rate.

8. The method of claim 7, further comprising, prior to the step of setting an access rate for a new service and releasing the new service in accordance with the access rate:
setting a number of accounts that can access the new service and releasing the new service to the accounts;
receiving a feedback from a user using the new service; and
increasing the number of accounts that can access the new service if the feedback is positive.

9. The method of claim 8, wherein increasing the number of accounts that can access the new service comprises:
setting an initial number and a maximum number of accounts that can access the new service; and
increasing the number of accounts that can access the new service from the initial number gradually to the maximum number.

10. The method of claim 7, further comprising, after the step of increasing the access rate for the new service:
releasing the new service to the entire server.

11. The method of claim 7, further comprising:
stopping the release of the new service if the feedback comprises an error message.

12. A non-transitory computer-readable medium having stored thereon computer-executable instructions that, when executed by a hardware processor of a server, cause the hardware processer to perform a method for releasing services on a server in stages, the method comprising:
setting an access rate for a new service and releasing the new service in accordance with the access rate, wherein the access rate indicates a number of accesses to the new service per unit time;
receiving a feedback from a user using the new service; and
increasing the access rate for the new service if the feedback is positive,
wherein releasing the new service in accordance with the access rate comprises:
determining a value of the access rate;
when an actual number of access requests received by the server during a unit time is greater than the value of the access rate, directing a portion of the actual number of access requests that are over the value of the access rate to an old service corresponding to the new service,
wherein increasing the access rate for the new service comprises:
setting an initial access rate and a maximum access rate for the new service; and
increasing the access rate for the new service from the initial access rate gradually to the maximum access rate.

13. The non-transitory computer-readable medium of claim 12, the method further comprising, prior to the step of setting an access rate for a new service and releasing the new service in accordance with the access rate:
   setting a number of accounts that can access the new service and releasing the new service to the accounts; and
   increasing the number of accounts that can access the new service if the feedback is positive.

14. The non-transitory computer-readable medium of claim 13, wherein increasing the number of accounts that can access the new service comprises:
   setting an initial number and a maximum number of accounts that can access the new service; and
   increasing the number of accounts that can access the new service from the initial number gradually to the maximum number.

15. The non-transitory computer-readable medium of claim 12, the method further comprising, after the step of increasing the access rate for the new service:
   releasing the new service to the entire server.

16. The non-transitory computer-readable medium of claim 12, the method further comprising:
   stopping the release of the new service if the feedback comprises an error message.

* * * * *